(12) United States Patent
Koyanagi

(10) Patent No.: US 6,483,451 B1
(45) Date of Patent: Nov. 19, 2002

(54) SAMPLING FUNCTION WAVEFORM DATA GENERATING DEVICE

(75) Inventor: Yukio Koyanagi, Saitama (JP)

(73) Assignee: Yasue Sakai, Urawa (JP)

( * ) Notice: Subject to any disclaimer, the term of this patent is extended or adjusted under 35 U.S.C. 154(b) by 0 days.

(21) Appl. No.: 10/009,653
(22) PCT Filed: Jul. 10, 2000
(86) PCT No.: PCT/JP00/04570
  § 371 (c)(1),
  (2), (4) Date: Dec. 10, 2001
(87) PCT Pub. No.: WO01/04789
  PCT Pub. Date: Jan. 18, 2001

(30) Foreign Application Priority Data

Jul. 9, 1999 (JP) .............................. 11-195516

(51) Int. Cl.[7] ................................. H03M 1/66
(52) U.S. Cl. ....................................... 341/144
(58) Field of Search ................ 341/144, 143, 341/61, 145, 117, 118, 120

(56) References Cited

U.S. PATENT DOCUMENTS 5,226,000 A * 7/1993 Moses et al. ............. 364/724.1
5,268,688 A * 12/1993 Meyers et al. ............... 341/143

FOREIGN PATENT DOCUMENTS

| JP | 59-153469 | 9/1984 |
| JP | 4-330858 | 11/1992 |
| JP | 5-335837 | 12/1993 |

OTHER PUBLICATIONS

Spline Functions and Applications, © Akira Sakurai 1981.

* cited by examiner

Primary Examiner—Brian Young
Assistant Examiner—John Nguyen
(74) Attorney, Agent, or Firm—Dellett and Walters

(57) ABSTRACT

A sampling function waveform data generating device for fast generating data on a waveform approximating a sampling function with a simple circuit structure. Data on a waveform of a step function is outputted from a memory 20. A first digital integrating circuit 30 integrates the data on waveform of the step function and outputs data on a waveform of a broken-line function. A second digital integrating circuit 40 integrates the data on the waveform of the broken-line function and outputs data on a waveform approximating a sampling function. The outputted sampling function is a function of a local support that is differentiable once, takes on 1 in sampling position t=0, 0 in all the other sampling positions, 0 in the ranges t<−3 and t>+3, and a value other than 0 in the other range, and converges to 0 in sampling positions t=±3.

5 Claims, 4 Drawing Sheets

SAMPLING FUNCTION WAVEFORM DATA GENERATING DEVICE

TECHNICAL FIELD

The present invention relates to a sampling function waveform data generating device for generating waveform data based on a sampling function.

BACKGROUND ART

Conventionally, a CD (Compact Disk) player, uses a D/A (digital-to-analog) converter to which an over-sampling technique is applied to obtain a continuous analog audio signal from discrete digital music data. Such a D/A converter generally uses a digital filter to raise a pseudo sampling frequency by interpolating input digital data, and outputs smooth analog voice signals by passing each interpolation value through a low-pass filter after generating a staircase signal waveform with each interpolation value held by the sample holding circuit.

A data interpolating process is performed with a digital filter mentioned above using a sampling function generally referred to as a sinc function. FIG. 7 is an explanatory graph of a sinc function. This sinc function is obtained when a Dirac delta function is inverse-Fourier-transformed, and is defined as $\sin(\pi ft)/(\pi ft)$ where the sampling frequency is f. This sinc function becomes one only at a sample point, where t=0, and zero at all other sample points. In the FIG. 7, sinc function corresponding to the range where t=±3 is showed.

A sinc function converges to 0 as a variable t goes to +∞ or −∞, and if the correct interpolated value is obtained, all the digital data values must be considered. However, actually, the tap coefficients of a digital filter are set up in a limited range of digital data under consideration from the convenience of the circuit scale, whereby the interpolated value contains a truncation error. This truncation error can be decreased by setting the number of tap coefficients for the digital filter at higher degree, in which there is a problem that the circuit scale is increased, with a tradeoff relation between decreasing the truncation error and reducing the circuit scale. Moreover, when such an oversampling operation is performed in DSP, etc., a value of the above mentioned sampling function (sinc function) has to be kept computing at a high speed, thereby limiting the process performance.

Such a problem is caused by employing the sinc function as a sampling function correctly. Considering that a truncation error or a quantizing noise may occur even when the sinc function is used, there is less need of generating the sinc function at high precision. Accordingly, if the function values approximating the sinc function can be generated fast in a predetermined range with a simple circuit structure, the data interpolation process is enabled by using the function values in the same manner as when using the sinc function.

DISCLOSURE OF THE INVENTION

The present invention has been developed based on the above mentioned problems, the object of the present invention is to provide a sampling function waveform data generating device for fast generating data on a waveform approximating a sampling function with a simple circuit structure.

A sampling function waveform data generating device of the present invention comprises data output unit for sequentially outputting digital waveform data of a predetermined step function, and digital integrating unit for digitally integrating the waveform data output from the data output unit to output a sampling function of a local support that takes 1 in sampling position t=0, 0 in all the other sampling positions, 0 in the range t<−n and t>+n where n is a positive integer greater than 1, and a value other than 0 in the other range, and converges to 0 in sampling positions t=+n.

The sinc function takes 1 only in sampling position t=0, and 0 in all the other sampling positions, and converges to 0 as t goes to +∞ or −∞m, as shown in FIG. 7. When this sinc function is applied to the practical circuit, a limited range of sampling position is employed so that a truncation error is overlooked in the current situation. Thus, in this invention, the sinc function itself is not output, but a waveform approximating the sinc function is output. Namely, the sinc function is substituted by a sampling function of a local support that is differentiable finite times, and takes 1 in sampling position t=0, 0 in all the other sampling positions, 0 in the range t<−n and t>+n where n is a positive integer greater than 1, and a value other than 0 in the other range, and converges to 0 in sampling positions t=+n. In order to obtain the waveform that is differentiable finite times, the integration may be made. For example, a broken-line function with a waveform as shown in FIG. 5 can be obtained by integrating a step function with a waveform as shown in FIG. 2. Further, a waveform approximating the sampling function as shown in FIG. 6 can be obtained by integrating the broken-line function with the waveform as shown in FIG. 5. Thus, in this invention, digital waveform data of the step function as shown in FIG. 2 is output sequentially, employing the data output unit, and then integrated plural times by the digital integrating unit, whereby the sampling function as shown in FIG. 6 is generated through the digital processing. The sampling function as shown in FIG. 6 converges to 0 in sampling positions t=±3, and can be employed to make the interpolation, whereby three sampling values before and after the interpolated position may be only considered to reduce the amount of operations largely. Also, since the interpolation is truncated at the sampling positions where the function converges to 0, but not halfway of the sampling positions to be operated such as the sinc function, the influence due to truncation error can be eliminated. Further, since the range of sampling position to be operated can be narrowed, the less number of data is necessary to be held so that the circuit scale can be reduced.

It is desirable that the digital integrating unit outputs a sampling function of a local support that takes 1 in sampling position t=0, 0 in sampling positions t=±1, t=±2, t<−3 and t>+3, and a value other than 0 in the other range, and converges to 0 in sampling positions t=±3. This is a case where the value of n is limited to 3, and it is possible to output a sampling function that converges to 0 in sampling positions t=±3, as shown in FIG. 6.

Also, it is desirable that the digital integrating unit outputs a sampling function of a local support that takes 1 in sampling position t=0, 0 in sampling positions t=±1, t<−2 and t>+2, and a value other than 0 in the other range, and converges to 0 in sampling positions t=±2. This is a case where the value of n is limited to 2, and it is possible to output a sampling function that converges to 0 in sampling positions t=±2.

Furthermore, the data output unit preferably comprises a memory for holding the values of the step function, and data reading unit for reading cyclically the values held in the memory in predetermined order. Since the waveform data of the sampling function having the value changing continuously can be generated only by holding the values of the step function, the circuit scale can be more reduced.

Furthermore, it is preferable that the sampling function is differentiable finite times. The sampling function that is differentiable finite times can be generated by integrating the waveform data of the step function a predetermined number of times, resulting in the simplified processing.

BEST MODE FOR CARRYING OUT THE INVENTION

Figure 1:
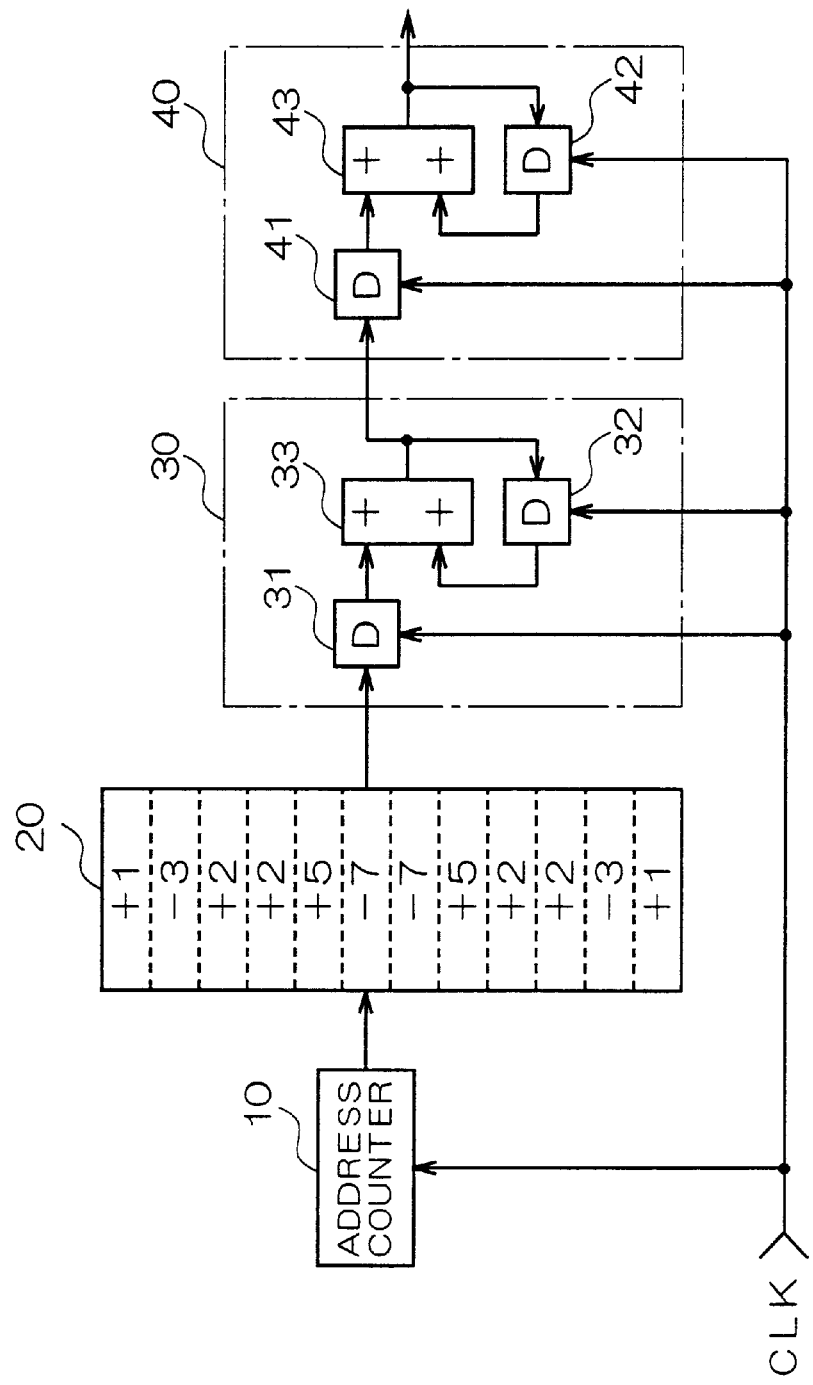
FIG. 1 is a block diagram showing a schematic hardware configuration of a sampling function waveform data generating device according to one embodiment of the present invention.

A sampling function waveform data generating device according to one embodiment of the present invention will be described below by reference to the accompanying drawings. FIG. 1 is a block diagram showing a schematic hardware configuration of a sampling function waveform data generating device according to one embodiment of the present invention.

Figure 7:
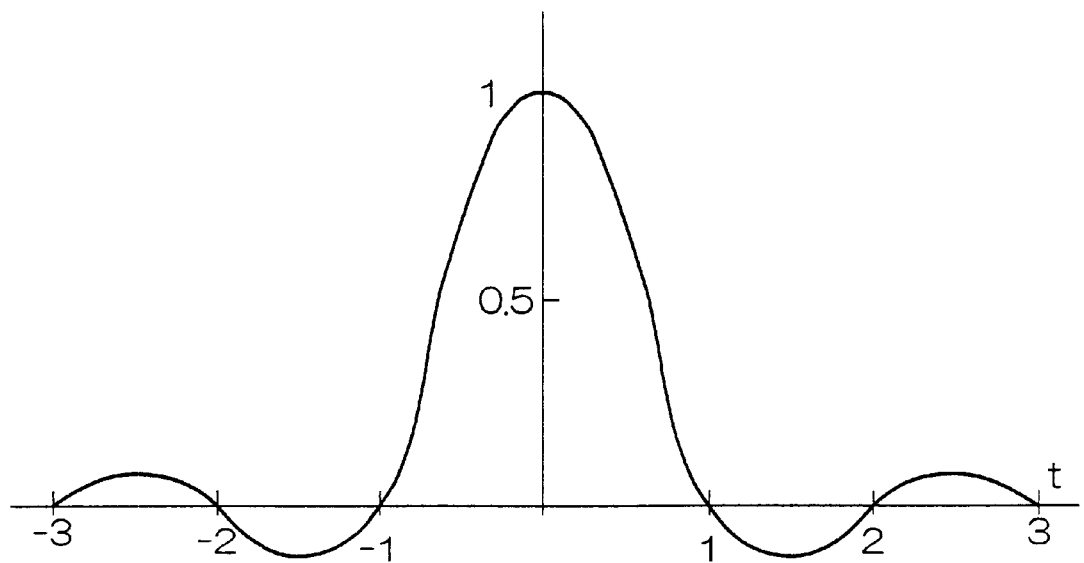
FIG. 7 is a graph showing one example of the waveform of a sinc function.

The sampling function waveform data generating device in FIG. 1 comprises an address counter 10, a memory 20, a first digital integrating circuit 30 and a second digital integrating 40. This sampling function waveform data generating device generates a sampling function approximating a sinc function, as shown in FIG. 7. The sampling function generated by this sampling function waveform data generating device is a finite support function that takes 1 in sampling position t=0, 0 in sampling positions t=±2, t=±3, t<−3 and t>+3, and a value other than 0 in the other range, and converges to 0 in sampling positions t=±3.

Figure 2:
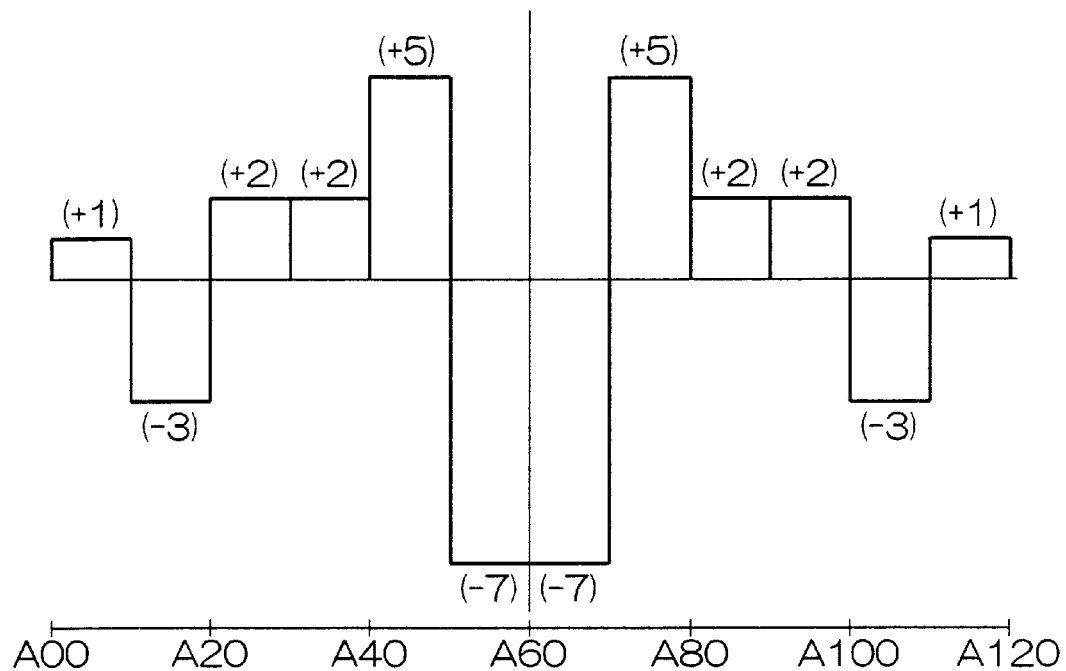
FIG. 2 is a graph showing a specific example of the waveform data of a step function output from a memory as shown in FIG.

An address counter 10, upon the input of a clock signal CLK at a predetermined period, counts it from "0" to "119" and outputs its count value cyclically to the reading address A00 to A119 in a memory 20. The memory 20 stores the waveform data along the step function as shown in FIG. 2 in a predetermined address space. The memory 20 stores data "+1" at an address A00 to A09, data "−3" at an address A10 to A19, data "+2" at an address A20 to A39, data "+5" at an address A40 to A49, data "−7" at an address A50 to A59, data "−7" at an address A60 to A69, data "+5" at an address A70 to A79, data "+2" at an address A80 to A99, data "−3" at an address A100 to A109, and data "+1" at an address A110 to A119.

A first digital integrating circuit 30 integrates the data output from the memory 20 at a timing in synchronization with the clock signal CLK in succession, and comprises the D-type flip-flops 31, 32 and an adder 33. A D-type flip-flop 31 temporarily holds the data output from the memory 20 in synchronization with the clock signal CLK, and inputs it into one input terminal of the adder 33. A D-type flip-flop 32 temporarily holds the data output from the adder 33 in synchronization with the clock signal CLK, and inputs it into the other input terminal of the adder 33. The adder 33 adds the data output from two D-type flip-flops 31, 32, and outputs its added value to a second digital integrating circuit 40.

The second digital integrating circuit 40 integrates the data output from the first digital integrating circuit 30 at a timing in synchronization with the clock signal CLK in succession, and comprises the D-type flip-flops 41, 42 and an adder 43, like the first digital integrating circuit 30. A D-type flip-flop 41 temporarily holds the data output from the first digital integrating circuit 30 in synchronization with the clock signal CLK, and inputs it into one input terminal of the adder 43. Similarly, a D-type flip-flop 42 temporarily holds the data output from the adder 43 in synchronization with the clock signal CLK, and inputs it into the other input terminal of the adder 43. The adder 43 adds the data output from two D-type flip-flops 41, 42, and outputs its added value as the waveform data of the sampling function.

The address counter 10 and the memory 20 correspond to the data output unit, and the first digital integrating circuit 30 and the second digital integrating circuit 40 correspond to the digital integrating unit, respectively. Also, the address counter 10 corresponds to data reading unit.

The operation of the sampling function waveform data generating device according to this embodiment of the invention will be described below by using the drawings. First of all, the address counter 10 outputs in succession the value at the reading address A00 to A119 to the memory 20 in synchronization with the clock signal CLK. The memory 20 outputs the waveform data of the step function as shown in FIG. 2, upon the input of the reading address A00 to A119. Namely, the memory 20 outputs in succession the data B00 to B119 stored at the address A00 to A119.

Figure 3:
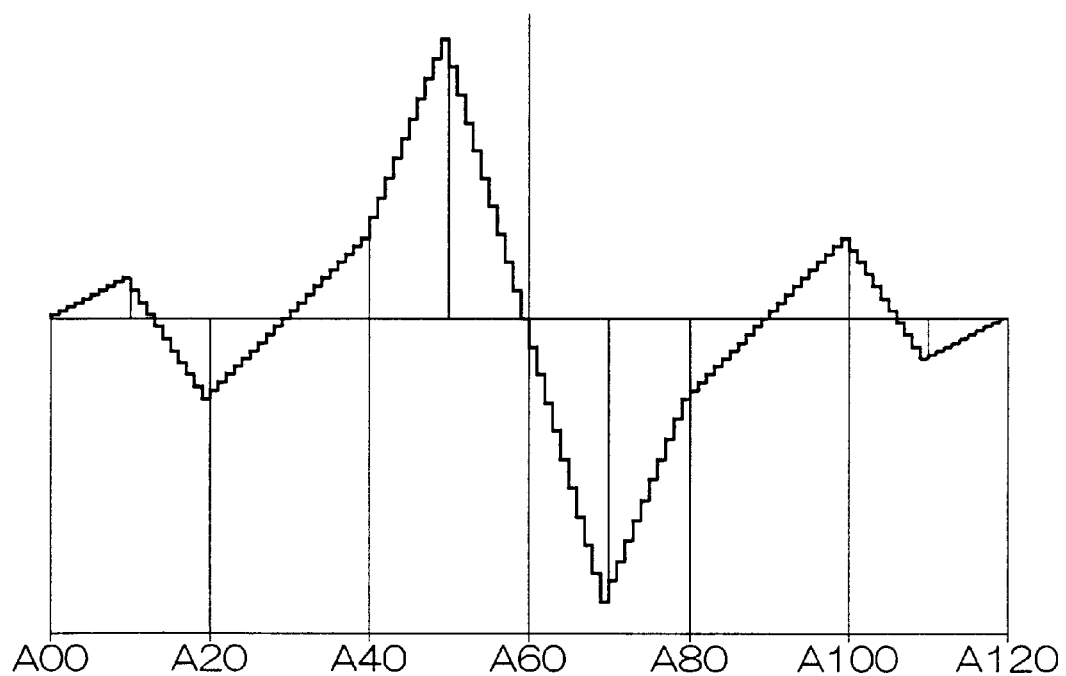
FIG. 3 is a graph showing a specific example of the waveform data of a broken-line function output from a first digital integrating circuit as shown in FIG. 1.

The first digital integrating circuit 30 integrates in succession the waveform data B00 to B119 of the step function output from the memory 20 in synchronization with the clock signal CLK, and outputs the waveform data C00 to C119 of the broken-line function composed of consecutive broken-lines as shown in FIG. 3.

The first digital integrating circuit 30 outputs the data C00 to C09 that correspond to "+1", "+2", "+3", . . . and "+10" in which the value "+1" of the data B00 to B09 is added in succession to "0" as a reference in the range where the data B00 to B09 is input. Also, the first digital integrating circuit 30 outputs the data C10 to C19 that correspond to "+7", "+4", "+1", . . . and "−20" in which the value "−3" of the data B10 to B19 is added in succession to "+10" (=C09) as reference in the range where the data B10 to B19 is input.

The first digital integrating circuit 30 outputs the data C20 to C39 that correspond to "−18", "−16", "−14", . . . and "+20" in which the value "+2" of the data B20 to B39 is added in succession to "−20" (=C19) as a reference in the range where the data B20 to B39 is input. Also, the first digital integrating circuit 30 outputs the data C40 to C49 that correspond to "+25", "+30", "+35", . . . and "+70" in which the value "+5" of the data B40 to B49 is added in succession to "+20" (=C39) as reference in the range where the data B40 to B49 is input.

The first digital integrating circuit 30 outputs the data C50 to C69 that correspond to "+63", "+56", "+49", . . . and "−70" in which the value "−7" of the data B50 to B69 is added in succession to "+70" (C=49) as a reference in the range where the data B50 to B69 is input. Also, the first digital integrating circuit 30 outputs the data C70 to C79 that correspond to "−65", "−60", "−55", ... and "−20" in which the value "+5" of the data B70 to B79 is added in succession to "−70" (=C69) as reference in the range where the data B70 to B79 is input.

The first digital integrating circuit 30 outputs the data C80 to C99 that correspond to "−18", "−16", "−14", ... and "+20" in which the value "+2" of the data B80 to B99 is added in succession to "−20" (C=79) as a reference in the range where the data B80 to B99 is input. Also, the first digital integrating circuit 30 outputs the data C100 to C109 that correspond to "+17", "+14", "+11", ... and "−10" in which the value "−3" of the data B100 to B109 is added in succession to "+20" (=C99) as reference in the range where the data B100 to B109 is input. The first digital integrating circuit outputs the data C110 to C119 that correspond to "−9", "−8", "−7", ... and "0" in which the value "+1" of the data B100 to B109 is added in succession to "−10" (=C109) as reference in the range where the data B110 to B119 is input. In this way, the data C00 to C119 output from the first digital integrating circuit 30 is input into the D-type flip-flop 41 of the second digital integrating circuit 40.

Figure 4:
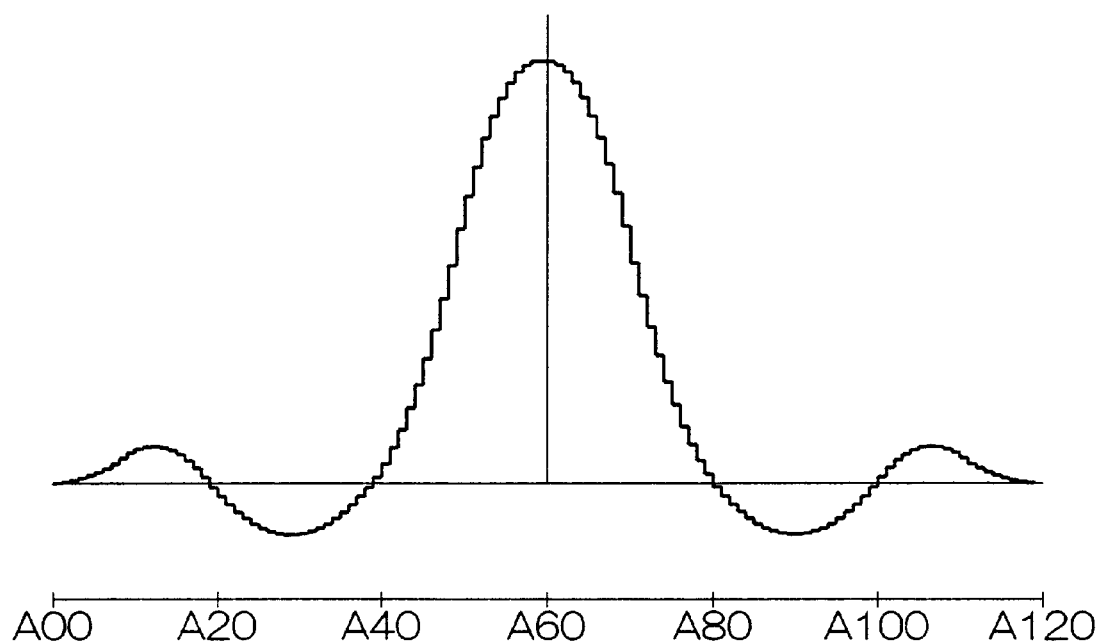
FIG. 4 is a graph showing a specific example of the waveform data of a sampling function output from a second digital integrating circuit as shown in FIG. 1.

The second digital integrating circuit 40 integrates in succession the waveform data C00 to C119 of the broken-line function output from the first digital integration function 30 in synchronization with the clock signal CLK, and outputs the waveform data D00 to D119 approximating the sampling function as shown in FIG. 4.

The second digital integrating circuit 40 outputs the value "+1" as the data D00, if the data C00 is input. Also, if the data C01 is input, it outputs the value "+3" in which the data C01 (="+2") is added to the value "+1" of the data D00 as the data D0. If the data C02 is input, it outputs the value "+6" in which the data C02 (="+3") is added to the value "+3" of the data D01 as the data D02. If the data C03 is input, it outputs the value "+10" in which the data C03 (="+4") is added to the value "+6" of the data D02 as the data D03. In this way, the second digital integrating circuit 40 integrates in succession the waveform data of the broken-line function, and outputs the waveform data approximating the sampling function as shown in FIG. 4.

Figure 5:
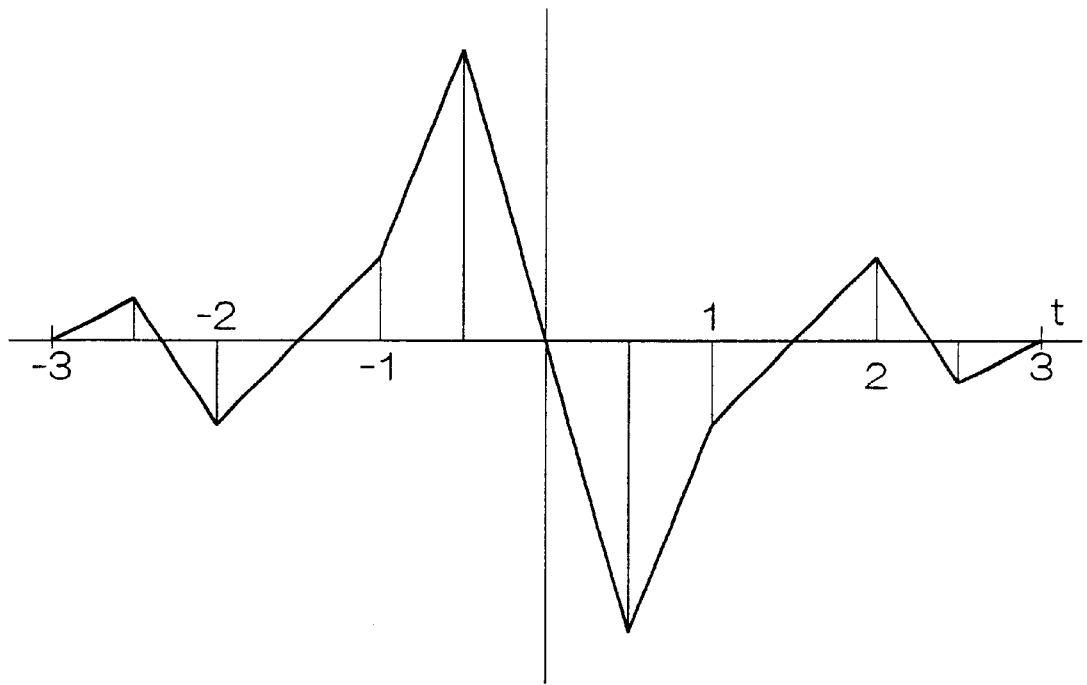
FIG. 5 is a graph showing a waveform of the broken-line function that is obtained by integrating the waveform of the step function as shown in FIG. 2.
Figure 6:
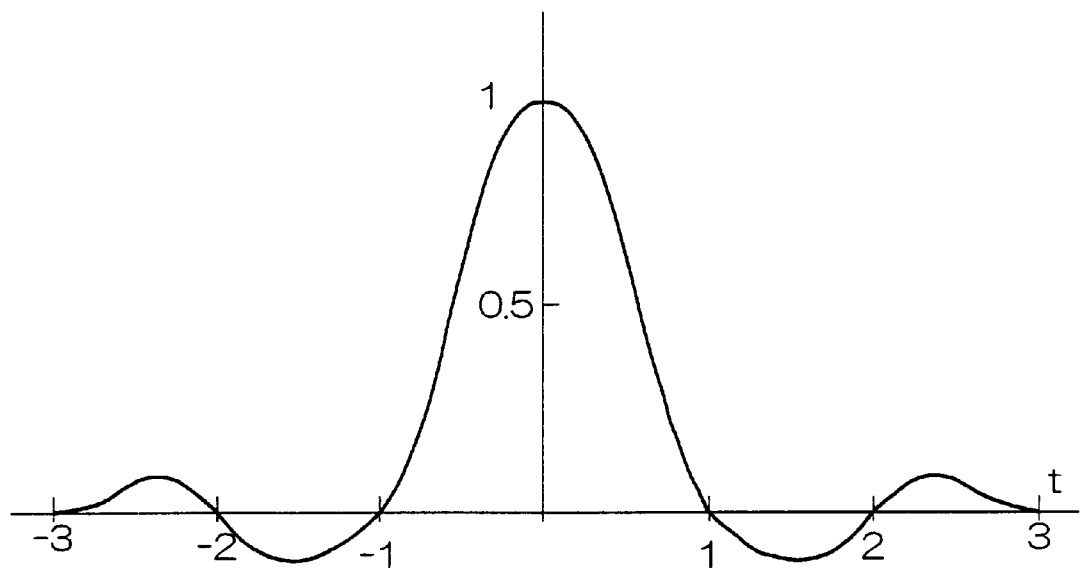
FIG. 6 is a graph showing a waveform of a sampling function that is obtained by integrating the waveform of the broken-line function as shown in FIG. 5.

Though the waveform data of the broken-line function as shown in FIG. 3 and the waveform data approximating the sampling function as shown in FIG. 4 consist of stepwise waveforms, this is due to the fact that one interval of the waveform data of the step function as shown in FIG. 2 is divided into ten, and if this interval is divided more finely, the smoother waveform of line and curve can be output, as shown in FIGS. 5 and 6.

With the sampling function waveform data generating device according to this embodiment of the invention, the waveform of the sampling function as shown in FIG. 6 can be output. The sampling function of FIG. 6 approximates the sinc function as shown in FIG. 7, and is a sampling function of a local support that takes 1 in sampling position $t=0$, 0 in sampling positions $t=\pm1$, $t=\pm2$, $t<-3$ and $t>+3$, and a value other than 0 in the other range, and converges to 0 in sampling positions $t=\pm3$. It is noted that a case where function values have finite values except zero in a local region and become zero in regions different from the region is called a local support.

If the discrete digital data is interpolated by employing the sinc function, it is required that the value of the sinc function is calculated at the interpolation position corresponding to each sampling point in $t<+\infty$ or $t>-\infty$, and convoluted. On the contrary, since the sampling function as shown in FIG. 6 converges to 0 in sampling positions $t=\pm3$, it suffices to consider three sampled values before and after the interpolation position, resulting in the less amount of operation. Since the interpolation is truncated at the sampling positions $t=\pm3$ where the function converges to 0, but not halfway of the sampling positions to be operated such as the sinc function, the influence due to truncation error can be eliminated.

The memory 20 for holding the values of the step function and the address counter 10 for reading cyclically the values held in this memory in a predetermined order are provided to generate the waveform data of the step function, whereby the waveform data of the sampling function having the value changing continuously can be generated only by holding the values of the step function, resulting in the reduced circuit scale.

The sampling function generated by the sampling function waveform data generating device in this embodiment is differentiable finite times (once in this embodiment), and can be obtained by integrating the waveform data of the step function twice digitally, resulting in the simplified operation.

The present invention is not limited to the above-described embodiments, but may be modified in various ways within the scope or spirit of the invention. For example, as described above, the sampling function generated in the above embodiment converges to 0 in sampling positions $t=\pm3$, as shown in FIG. 7. However, the sampling function may converge to 0 in sampling positions $t=\pm2$ or $t>+3$ or $t<-3$. For example, the data "−1" at address A00 to A09, the data "+3" at address A10 to A19, the data "+5" at address A20 to A29, the data "−7" at address A30 to A49, the data "+5" at address A50 to A59, the data "+3" at address A60 to A69, the data "−1" at address A70 to A79 may be stored in the memory 20, and the data may be cyclically output from the reading address A00 to A79 in accordance with the address counter 10. In this case, the waveform data based on the sampling function output from the second digital integrating circuit 40 is a sampling function of a local support that takes 1 in sampling position $t=0$, 0 in sampling positions $t=\pm1$, $t<-2$ and $t>+2$, and a value other than 0 in the other range, and converges to 0 in sampling positions $t=\pm2$. If the value of n is 2, the range of operation can be further narrowed, whereby it is possible to simplify the processing and reduce the circuit scale.

Furthermore, in the above embodiment, the memory 20 is read sequentially by the counter 10. However, a register may be provided to store the data in the memory 20, and selected in succession in accordance with a count value output from the address counter 10. The memory 20 stores the data in a memory space corresponding to an output from the counter 10. However, twelve pieces of data may be stored at the address A00 to A11 in the memory 20 in succession, and the upper bits of the count value output from the address counter 10 may be supplied to the memory 20 as the count value or reading address A00 to A11, with the lower four bits of the count value masked. In this case, one interval of the step waveform of FIG. 2 is equally divided into sixteen. In this case, the number of divisions for one interval of the step function of FIG. 2 is determined by increasing the number of bits to be masked.

The digital waveform data of the sampling function output from the second digital integrating circuit 40 as shown in FIG. 1 may be output through a low-pass filter.

INDUSTRIAL APPLICABILITY

As described above, employing a sampling function generated according to the invention, n sampled values before and after an interpolation position may be considered, thereby resulting in considerably reduced amount of operations. Also, since the interpolation is truncated at the sampling positions where the function converges to 0, but not halfway of the sampling positions to be operated such as the sinc function, the influence due to truncation error can be eliminated. Further, since the range of sampling position to be operated can be narrowed, the less number of data is necessary to be held so that the circuit scale can be reduced.

What is claimed is:

1. A sampling function waveform data generating device, characterized by comprising:

data output unit for sequentially outputting digital waveform data of a step function; and digital integrating unit for digitally integrating said waveform data output from said data output unit plural times to output a sampling function of a local support that takes 1 in sampling position t=0, 0 in all the other sampling positions, 0 in the range t<−n and t>+n where n is a positive integer greater than 1, and a value other than 0 in the other range, and converges to 0 in sampling positions t=±n.

2. The sampling function waveform data generating device according to claim 1, characterized in that said digital integrating unit outputs a sampling function of a local support that takes 1 in sampling position t=0, 0 in sampling positions t=±1, t=±2, t<−3 and t>+3, and a value other than 0 in the other range, and converges to 0 in sampling positions t=±3.

3. The sampling function waveform data generating device according to claim 1, characterized in that said digital integrating unit outputs a sampling function of a local support that takes 1 in sampling position t=0, 0 in sampling positions t=±1, t<−2 and t>+2, and a value other than 0 in the other range, and converges to 0 in sampling positions t=±2.

4. The sampling function waveform data generating device according to claim 1, characterized in that said data output unit comprises:

a memory for holding the values of said step function; and data reading unit for reading cyclically the values held in said memory in predetermined order.

5. The sampling function waveform data generating device according to claim 1, characterized in that said sampling function is differentiable finite times.

\* \* \* \* \*